United States Patent [19]
Edling et al.

[11] Patent Number: 5,575,486
[45] Date of Patent: Nov. 19, 1996

[54] GROOVED RUN-IN FACE SEAL

[75] Inventors: Jan K. J. Edling, Älvsjö ; Rolf A. Jacobsson, Saltsjö-Boo, both of Sweden

[73] Assignee: Atlas Copco Tools AB, Nacka, Sweden

[21] Appl. No.: 601,416

[22] Filed: Feb. 14, 1996

Related U.S. Application Data

[63] Continuation of Ser. No. 128,467, Sep. 28, 1993, abandoned.

[30] Foreign Application Priority Data

Oct. 1, 1992 [SE] Sweden ................................ 9202849

[51] Int. Cl.$^6$ ............................................. F16J 15/34
[52] U.S. Cl. ............................................ 277/96; 277/96.1
[58] Field of Search ................................. 277/42, 56, 57, 277/88, 96, 96.1, 96.2

[56] References Cited

U.S. PATENT DOCUMENTS

| | | | |
|---|---|---|---|
| 2,347,118 | 4/1944 | Matter | 277/42 |
| 2,668,068 | 2/1954 | Bredemeier | 277/96 |
| 3,515,393 | 6/1970 | Metcalfe | 277/42 |
| 3,755,870 | 9/1973 | Young et al. | 277/56 X |
| 4,391,450 | 7/1983 | Beck | 277/96.2 X |

FOREIGN PATENT DOCUMENTS

| | | | |
|---|---|---|---|
| 530777 | 9/1956 | Canada . | |
| 685846 | 7/1930 | France | 277/57 |
| 812787 | 5/1937 | France | 277/96.1 |
| 283575 | 4/1915 | Germany . | |
| 1006677 | 4/1957 | Germany . | |
| 1650061 | 9/1969 | Germany . | |
| 59-219577 | 12/1984 | Japan . | |
| 751887 | 7/1956 | United Kingdom | 277/96 |

OTHER PUBLICATIONS

Patent Abstracts Of Japan, vol. 9, No. 94 (M-374) (1817), Apr. 24, 1985 & JP-A-59 219 577 (Arai Seisakusho) Dec. 10, 1984.

*Primary Examiner*—Scott Cummings
*Attorney, Agent, or Firm*—Frishauf, Holtz, Goodman, Langer & Chick

[57] ABSTRACT

An oil seal for sealing off a fast rotating shaft (10) relative to a housing (11) comprises a first seal element (15) mounted on the shaft (10), a second seal element (18) resiliently mounted in the housing (11), both seal elements (15, 18) having cooperating contact surfaces (25, 26), and a spring (22) acting on the second seal element (18) to provide an axial contact pressure between the contact surfaces (25, 26). The contact surfaces (25, 26) of the seal elements (15, 18) are made of materials of different hardness, and the one consisting of the hardest material is formed with one or more circular ribs (27a–c) disposed concentrically with the shaft (10) and intended to cut mating circular grooves in the other seal element contact surface (25) during a running-in period.

8 Claims, 1 Drawing Sheet

GROOVED RUN-IN FACE SEAL

This application is a Continuation of application Ser. No. 08/128,467, filed Sep. 28, 1993, now abandoned.

BACKGROUND OF THE INVENTION

This invention concerns an oil seal for sealing off a fast rotating shaft relative to a housing and including a first seal element associated with and corotating with the shaft, a second seal element associated with the housing, annular contact surfaces on the seal elements, and a spring means exerting an axial bias force on one of the seal elements so as to provide a contact pressure between the contact surfaces.

A problem concerned with oil seals of the above type is that there are extremely high demands on the accuracy of the contact surfaces to obtain a perfect tightness. To satisfy these demands there is required a costly and space demanding seal design. This is a serious drawback when employing this type of seal on a small size machinery where both costs and space are important to minimize.

SUMMARY OF THE INVENTION

This problem is solved by the invention as it comprises an improved seal element design which despite low costs and a low space demand provides a very high degree of tightness.

The basic idea behind the seal design according to the invention means that the seal elements and their contact surfaces are accurately centered relative to each other, whereby is obtained a high degree of adaptation of the contact surfaces to each other and, accordingly, a high degree of tightness, even during a running-in period.

A preferred embodiment of the invention is described below with reference to the accompanying drawing.

DESCRIPTION OF THE PREFERRED EMBODIMENT

Figure 1:
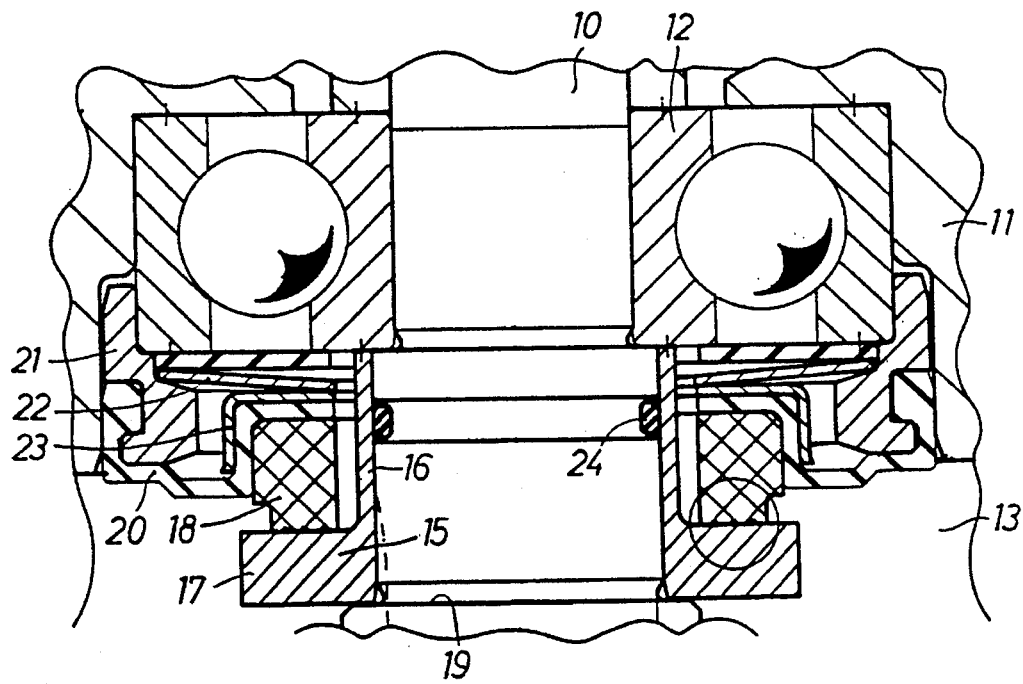
FIG. 1 shows an axial section through an oil seal according to the invention.

The device shown on the drawing comprises a rotating shaft 10 journalled in a housing 11 by means of a ball bearing 12. The housing 11 comprises a chamber 13 which contains lubricating oil for a gear transmission or the like. A suitable application for the oil seal described below is the output shaft of an air turbine, where the high rotation speed of the output shaft is reduced by a gearing running in an oil bath.

The oil seal between the shaft 10 and the housing 11 comprises a first seal element 15 in the form of a metal sleeve 16 provided with a radial flange 17 and rigidly secured between the bearing 12 and a shoulder 19 on the shaft 10. A second ring shaped seal element 18 is supported by a membrane 20 of a resilient material and secured in the housing 11 by a retaining ring 21. A washer type spring 22 acts between the bearing 12 and the seal element 18. The membrane 20 is provided with a stiffening metal ring 23 for distributing evenly the axial bias force exerted by the spring 22 and for increasing the radial clamping force on the seal element 18.

The seal element 18, which preferably is made of a relatively soft material with low friction coefficient, such as bakelite, is formed with an axially facing contact surface 25 which is intended to sealingly cooperate with an oppositely facing contact surface 26 on the flange 17 of the other seal element 15. A contact pressure between these surfaces 25, 26 is accomplished by the bias force of spring 22. An O-ring 24 prevents oil from leaking between the seal element 15 and the shaft 10.

Originally, the contact surface 25 of the soft material seal element 18 is completely flat, whereas the contact surface 26 of the harder metal seal element 15 is formed with three circular ribs 27a, b, c which are disposed concentrically with each other as well as with the shaft 10.

Figure 2:
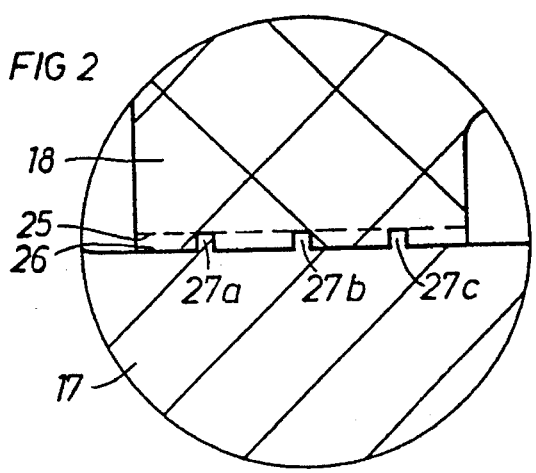
FIG. 2 shows, on a larger scale, a fractional view of the seal in FIG. 1.

When the seal device is first assembled, the flat contact surface 25 of the seal element 18 rests on the tops of the ribs 27a–c as illustrated with a dash line in FIG. 2. During a running-in period, however, the high contact pressure between the narrow ribs 27a–c and the surface 25 makes the ribs 27a–c cut their way into the softer material of the seal element 18, as illustrated in full lines in FIG. 2, such that a full surface sealing cooperation between the seal elements 15, 18 is obtained.

The circular ribs 27a–c serve to accomplish a centering of the axially as well as radially movable seal element 18 relative to the rotating seal element 15. Thereby, there is obtained a very good self adaptation of the sealing surfaces 25, 26 relative to each other and, as a result a high degree of tightness.

The ribs 27a–c have relatively small cross sectional dimensions and are primarily not intended to form a labyrinth type of seal. In a practical case, an oil seal with an outer diameter of 15 mm and ribs of a square dimension of 0.1×0.1 mm have resulted in a very good oil tightness. As clearly shown in FIG. 2, the total active contact area of the ribs 27a–c in contact with the softer seal element 18 is several times smaller than the total active contact area of the contact surfaces 25, 26.

We claim:

1. An oil seal for sealing off a fast rotating shaft (10) relative to a housing (11), comprising:

a first seal element (15) associated with and co-rotating with said shaft (10);

a second seal element (18) associated with said housing (11);

said first and second seal elements (15, 18) each having an annular axially facing flat contact surface (25, 26) for sealing cooperation with the contact surface of the other of said first and second seal elements (15, 118), one of said first and second seal elements (15, 18) being axially movable; and a spring means (22) arranged for exerting a continuous axial bias force on said movable one of said seal elements toward the other of said seal elements, thereby providing a contact pressure between said contact surfaces (25, 26); and wherein:

one of said seal elements is formed of a harder material, and the other one of said seal elements is formed of a softer material which is softer than said harder material, and said harder material seal element comprises at least one narrow circular guide rib (27a–c) disposed concentrically with the rotating shaft (10) and arranged to form, during an initial running-in mode and under a relatively high contact pressure accomplished by said bias force, at least one mating circular groove in said softer material seal element, wherein a total active contact area of said at least one rib (27a–c) in contact with said softer material seal element which is established during a running-in period is several times smaller than a total active contact area of said contact surfaces (25, 26), and wherein in a continuous service mode succeeding said initial running-in mode, said at least one circular groove has reached a depth equal to the axial extent of said at least one guide rib (27a–c), and a sealing contact between said contact surfaces (25, 26) is established and maintained under a relatively low contact pressure.

2. An oil seal according to claim 1, wherein said spring means (22) exerts a continuous axial bias force on said movable seal element (18) which is formed of a softer material toward the other seal element (15) which is formed of a harder material.

3. An oil seal according to claim 1, wherein said at least one circular guide rib (27a–c) is substantially rectangular in cross section.

4. An oil seal according to claim 2, wherein said at least one circular rib (27a–c) is substantially rectangular in cross section.

5. An oil seal according to claim 1, wherein:

said harder material seal element (15) is made of a metal; and said softer material seal element (18) is made of a low friction type synthetic material.

6. An oil seal according to claim 2, wherein:

said harder material seal element (15) is made of a metal; and said softer material seal element (18) is made of a low friction type synthetic material.

7. An oil seal according to claim 3, wherein:

said harder material seal element (15) is made of a metal; and said softer material seal element (18) is made of a low friction type synthetic material.

8. An oil seal according to claim 4, wherein:

said harder material seal element (15) is made of a metal; and said softer material seal element (18) is made of a low friction type synthetic material.

* * * * *